United States Patent [19]

Morgulis

[11] Patent Number: 4,832,304
[45] Date of Patent: May 23, 1989

[54] GROUND-ANCHORING DEVICE PARTICULARLY FOR UMBRELLAS

[75] Inventor: Alexander Morgulis, Herzlia, Israel

[73] Assignee: Tzvika Shahak, Tel Mond, Israel; a part interest

[21] Appl. No.: 197,189

[22] Filed: May 23, 1988

[51] Int. Cl.$^4$ ............................................. A01K 97/10
[52] U.S. Cl. .................................. 248/533; 52/157; 135/16; 248/530; 248/545; 248/156
[58] Field of Search ............... 248/545, 530, 533, 156, 248/507, 284, 291, 168, 170, 434, 535; 52/157; 135/16, 118, 66

[56] References Cited

U.S. PATENT DOCUMENTS

| | | | |
|---|---|---|---|
| 731,437 | 6/1903 | Czermak et al. | 135/66 X |
| 1,324,605 | 12/1919 | McKinney | 248/168 |
| 2,168,830 | 8/1939 | Schroth | 248/545 |
| 2,211,283 | 8/1940 | Mercer | 248/545 |
| 3,286,962 | 11/1966 | Warth | 248/545 |
| 4,420,918 | 12/1983 | Arnou et al. | 52/157 |
| 4,469,302 | 9/1984 | Stout | 248/535 X |
| 4,588,157 | 5/1986 | Mills | 248/545 |
| 4,753,411 | 6/1988 | Lechner et al. | 248/545 X |

Primary Examiner—Ramon O. Ramirez
Attorney, Agent, or Firm—Benjamin J. Barish

[57] ABSTRACT

A ground-anchoring device for anchoring a pole in the ground, comprises a post formed with spiral threads at one end for threading into the ground; a socket at the opposite end for receiving an end of the pole to be anchored in the ground; and a pair of arms pivotally mounted at the opposite end of the post from a horizontal position facilitating the rotation of the post to thread it into the ground, or to a vertical position. The pair of arms include clamping elements movable to a releasing position with respect to the socket when the arms are in their horizontal positions, or to a clamping position when the arms are in their vertical positions to clamp the pole within the socket.

20 Claims, 5 Drawing Sheets

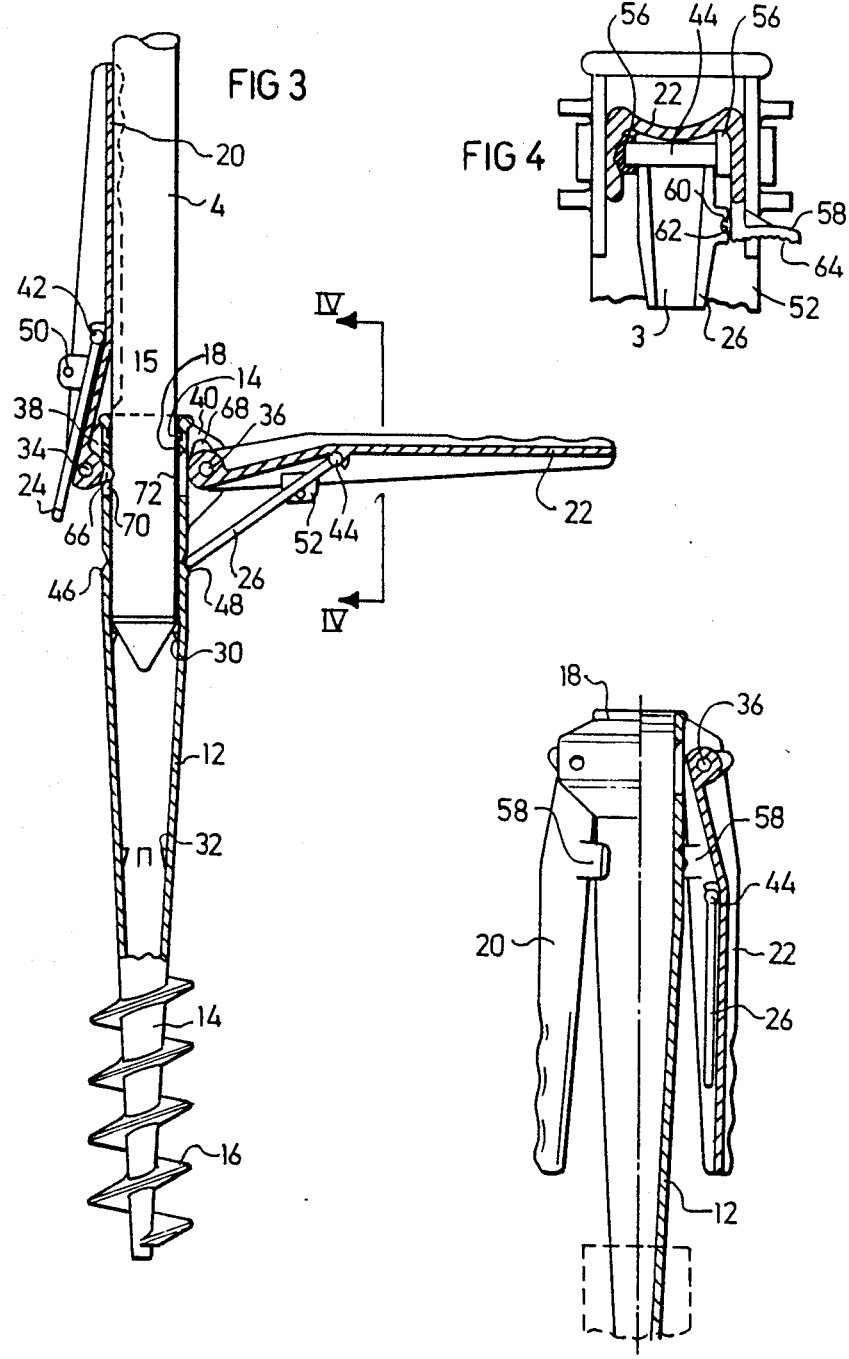

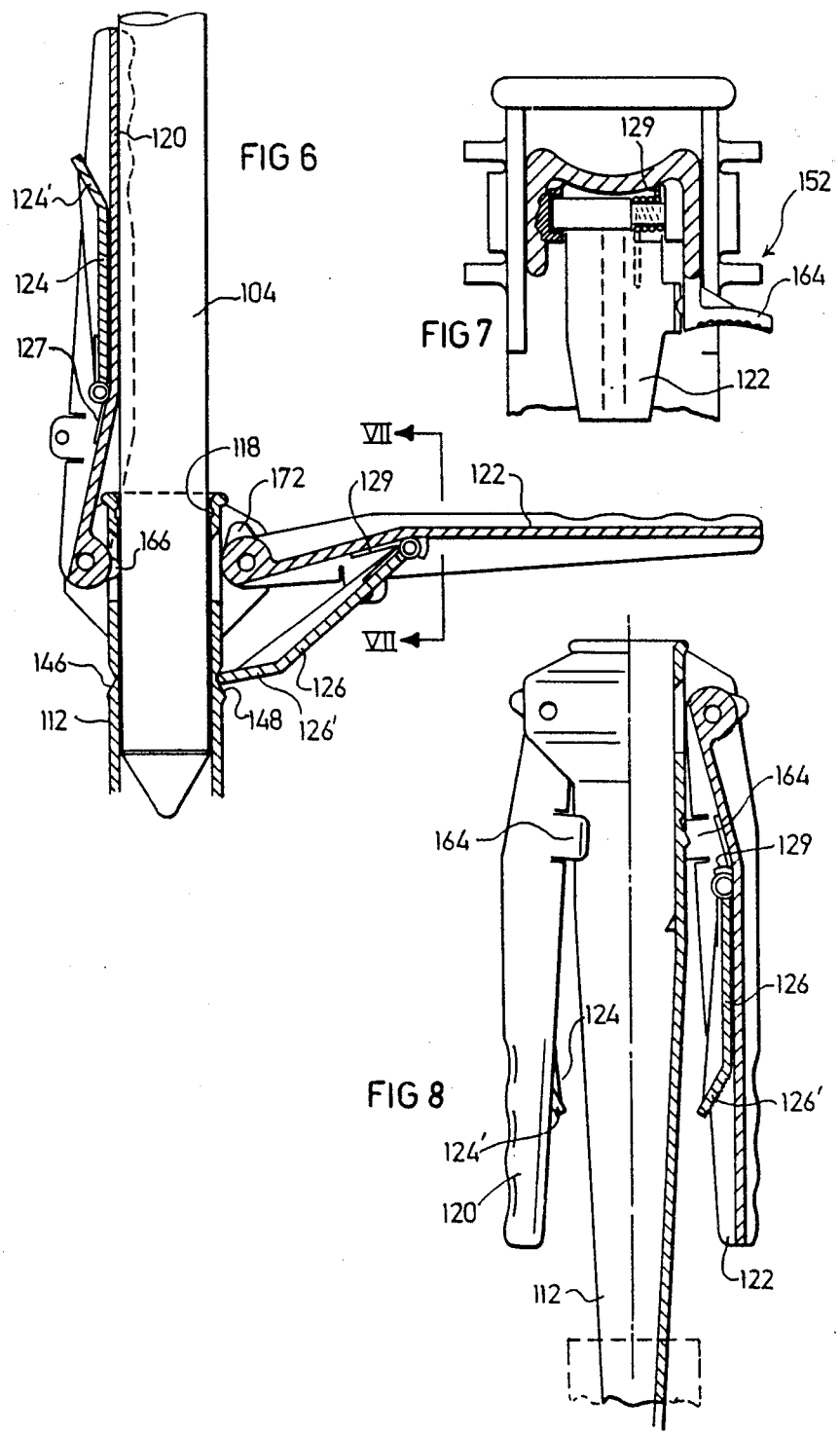

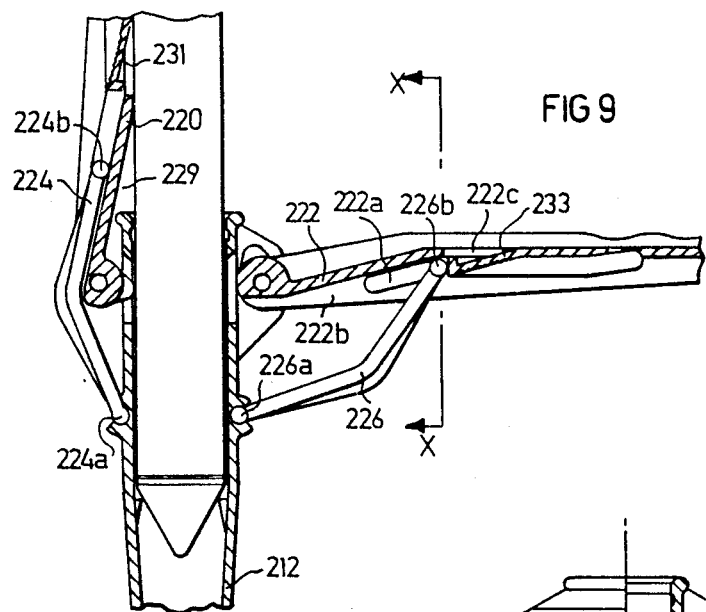
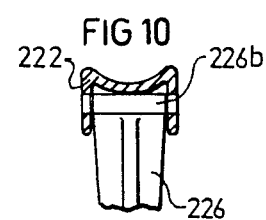
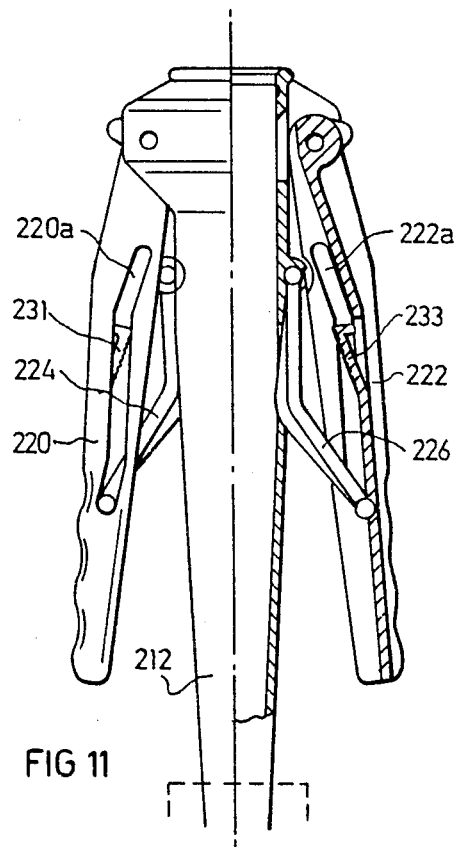

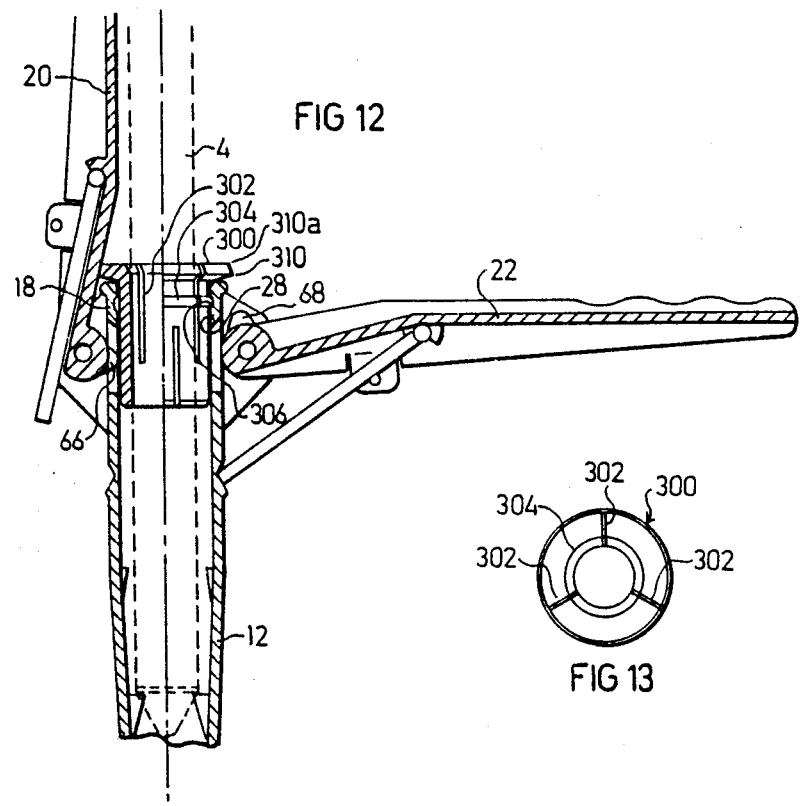

GROUND-ANCHORING DEVICE PARTICULARLY FOR UMBRELLAS

BACKGROUND OF THE INVENTION

The present invention relates to ground-anchoring devices for anchoring a pole in the ground. The invention is particularly applicable to support umbrellas over the ground, and is therefore described below with respect to this application, although it will be appreciated that the invention could advantageously be used also for ground-anchoring other devices, such as tables, tent poles, and the like.

Umbrellas are widely used in the back yard and at the beach to provide shade against the sun. They are usually supported by relatively wide bases resting on the ground, or are incorporated in the tables which, in turn, are provided with relatively large supporting bases. Such known arrangements are not only complicated and expensive, but are also relatively bulky which make them inconvenient to transport and to store when not in use.

OBJECTS AND BRIEF SUMMARY OF THE INVENTION

An object of the present invention is to provide a ground-anchoring device particularly useful for supporting umbrellas, tables or similar devices on the ground, which device is of inexpensive construction, easy to use, and foldable to a compact arrangement for handling, transportation or storage when not in use.

According to the present invention, there is provided a ground-anchoring device for anchoring a pole in the ground, comprising: a post formed with spiral threads at one end for threaded into the ground; a socket at the opposite end for receiving an end of the pole to be anchored in the ground; and a pair of arms pivotally mounted at the opposite and from a horizontal position facilitating the rotation of the post to thread it into the ground, or to a vertical position. The pair of arms include clamping elements movable to a releasing position with respect to the socket when the arms are in their horizontal positions, or to a clamping position engaging and clamping a pole within the socket when the arms are in their vertical positions to clamp the pole within the socket.

According to a further feature in the preferred embodiments described below, the clamping elements are cam surfaces formed at the ends of the arms so as to be located externally of the socket when the arms are in their horizontal positions, and to project into the socket when the arms are in their upper vertical positions. More particularly, the arms are pivotal to an upper vertical position to extend above their pivotal mountings on opposite sides of the pole received in the socket, or to a lower vertical position to extend below their pivotal mountings to provide a folded compact assembly for handling or storage. The arms are preferably of curved cross-section to engage the pole therein when the arms are pivoted to their upper vertical position, to thereby aid in supporting the pole when received in the socket.

According to a further feature in the described preferred embodiments, the arms are supported in their horizontal positions by a pair of bracing members each pivotally mounted to either an extended bracing position or to a retracted folded position substantially parallel to their respective arms.

As will be better apparent from the description below of several preferred embodiments of the invention, the ground-anchoring device of the present invention may be constructed of a relatively few simple parts which can be conveniently used to anchor an umbrella pole, table, tent pole, or similar device in the ground, and which can be disassembled into a very compact form for storage, transportation or storage when not in use.

Further features and advantages of the invention will be apparent from the description below.

BRIEF DESCRIPTION OF THE DRAWINGS

The invention is herein described, by way of example only, with reference to the accompanying drawings, wherein:

FIG. 3 is a longitudinal sectional view illustrating the ground-anchoring device of FIGS. 1 and 2;

FIG. 4 is an enlarged sectional view along lines IV—IV of FIG. 3;

FIG. 5 is a fragmentary view illustrating the ground-anchoring device of FIG. 3 in its folded compact position for storing, handling or transportation;

FIG. 6 is a longitudinal sectional view illustrating a second form of ground-anchoring device constructed in accordance with the present invention;

FIG. 7 is an enlarged sectional view along line VII—VII of FIG. 6;

FIG. 8 illustrates the device of FIGS. 6 and 7 in its folded compact condition;

FIG. 9 is a longitudinal sectional view illustrating a third form of ground-anchoring device constructed in accordance with the present invention;

FIG. 10 is an enlarged sectional view along line X—X of FIG. 9;

FIG. 11 is a sectional view illustrating the ground-anchoring device of FIGS. 9 and 10 in its folded compact condition;

FIG. 12 is a sectional view illustrating the provision of an adapter sleeve in the ground-anchoring device in order to accommodate different size poles; and FIG. 13 is a top plan view illustrating the adapter sleeve used in the device of FIG. 12.

DESCRIPTION OF PREFERRED EMBODIMENTS

The Embodiment of FIGS. 1–5

Figure 1:
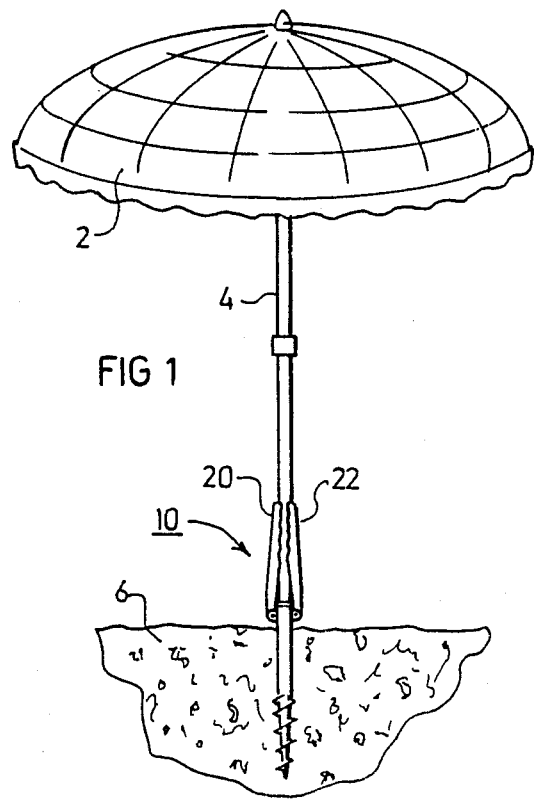
FIG. 1 pictorially illustrates an umbrella pole anchored in the ground by a ground-anchoring device constructed in accordance with the present invention.
Figure 2:
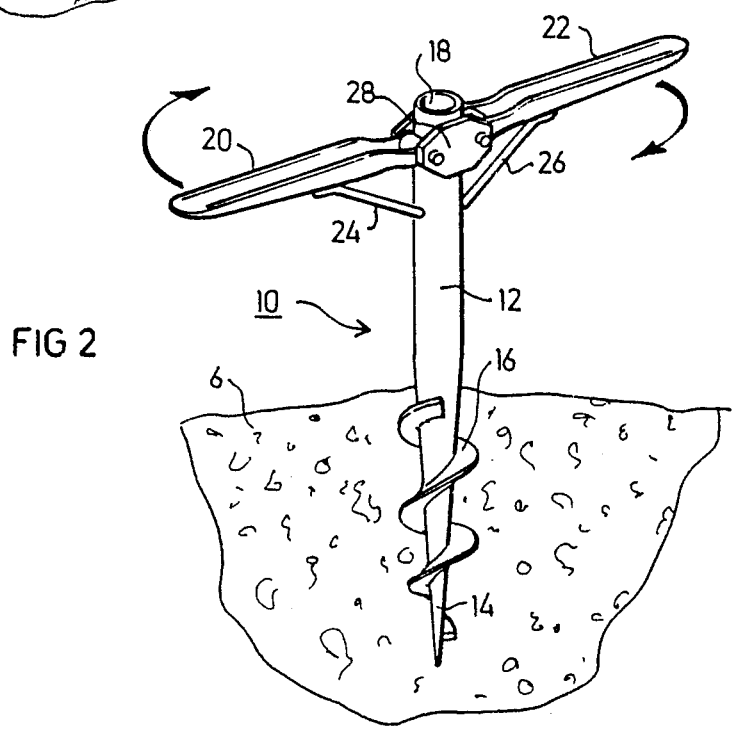
FIG. 2 illustrates the ground-anchoring device of FIG. 1 and the manner in which it is anchored in the ground.

FIG. 1 illustrates a sun umbrella 2 supported at the end of a pole 4 anchored in the ground 6 by a ground-anchoring device, generally designated 10. The ground-anchoring device 10, as more particularly illustrated in FIG. 2, comprises a post 12 having a pointed end 14 formed with spiral threads 16 for threading into the ground, a socket 18 at the opposite end for receiving the end of the umbrella pole 4 (FIG. 1), and a pair of arms 20, 22 pivotally mounted adjacent to socket 18 to any one of three positions, namely: (a) a horizontal position as illustrated in FIG. 2, (b) an upper vertical position as illustrated in FIG. 1, or (c) a lower vertical position as illustrated in FIG. 5.

The arms 20, 22 are supported in their horizontal positions by a pair of bracing members 24, 26, and in this position they facilitate the rotation of the post 12 to thread its pointed end 14 into the ground. When the arms 20, 22 are in their upper vertical positions, as illustrated in FIG. 1, they are effective to clamp the umbrella pole 4 to firmly hold it within the socket 18, the arms being formed with a curved cross-section as illustrated in FIG. 2 to engage the pole therein and thereby to aid in supporting the pole within the socket where they are clamped by cam elements, to be described below. When the arms 20, 22 are pivoted to their lower vertical positions, as illustrated in FIG. 5, they form a folded compact assembly for convenient handling, transportation or storage.

Post 12 is of a tapered hollow construction so that its upper open end defines the socket 18 for receiving the umbrella pole 4. The tapered configuration of post 12 enables it to receive poles of different diameters. An upper series of internal projections 30 act as stops when a larger-diameter pole is received within the post, and a lower series of internal projections 32 act as stops when a smaller-diameter pole is received within the post.

The two arms 20, 22 are pivotally mounted by pins 34, 36 to two plates 38, 40, fixed to the opposite sides of socket 18. The two bracing members 24, 26 are in the form of rods pivotally mounted by pins 42, 44 to the undersides of the two arms 20, 22, the opposite ends of the two bracing rods being turned inwardly and received within recesses 46, 48 formed in the outer surfaces of posts 12. Each of the bracing rods 24, 26 is releasably retained in its extended bracing position by a yieldable latching device, generally seen at 50 and 52, respectively, FIG. 3.

FIG. 4 more particularly illustrates the pivotal mounting of bracing rod 26 and its latching device 52, it being appreciated that bracing rod 24 and its latching device 50 are similarly constructed.

Thus, as shown in FIG. 4, pivot pin 44 carrying arm 22 is pivotally mounted within bearings 56 carried by the underface of arm 22. The underface of arm 22 further includes a yieldable fingerpiece 58 formed on its inner face with a projection 60 receivable within a recess 62 in the outer face of bracing rod 26, when the bracing rod is in its extended bracing position as illustrated in FIGS. 3 and 4, thereby latching the bracing rod in this extended position with its opposite end received within recess 48 formed in post 12. To release the bracing rod 26 from its extending bracing position, fingerpiece 58 is pressed upwardly, its undersurface being roughened for this purpose as shown at 64 (FIG. 4). The fingerpiece thus flexes to move its projection 60 out of recess 62, thereby releasing the bracing rod for pivotal movement to its folded, retracted position substantially parallel to and against the underface of its arm, as shown by the position of bracing rod 24 with respect to its arm 20 in FIG. 3.

The inner ends of the two arms 20, 22, inwardly of their pivot pins 34, 36, are formed with projections 66, 68 movable within openings 70, 72, formed in the socket 18 portion of post 12. Projections 66, 68 are located such that when the arms 20, 22 are pivoted to their upper vertical positions, these projections project through openings 70, 72 formed in the socket 18 of post 12, so as to engage, and thereby to firmly clamp, the umbrella pole 4 received with the socket. When the arms 20, 22 are pivoted to either their lower vertical positions, or their horizontal positions, these projections 66, 68 are moved out of openings 70, 72 so as not to project within the socket, and thereby release the pole for removal from the socket.

The manner of using the ground-anchoring device 10 illustrated in FIGS. 3–5 will be apparent from the above description. Thus, device 10 is normally in its folded condition as illustrated in FIG. 5, wherein the two arms 20, 22 are folded to their lower vertical positions substantially parallel to post 12, and with the bracing rods 24, 26 also folded substantially parallel to their respective arms 20, 22.

When it is desired to anchor the umbrella 2 (or other similar article) into the ground, arms 20, 22 are moved to their horizontal position as shown in FIG. 2 (perpendicular to post 12), and are latched in this position by the free inturned ends of bracing rods 24, 26 being received within recesses 46, 48 formed in the outer surface of post 14. The bracing rods 24, 26 are latched in this extending bracing position by projections 60 (FIG. 4) of the fingerpieces 58 received with recesses 62 formed in the respective end of the bracing rods. Arms 20, 22 may thus be used to rotate the post 12 in order to cause its spiral threads 16 to anchor the post in the ground 6.

While the arms 20, 22 are still in their horizontal positions, the umbrella pole 4 is inserted into socket 18 at the upper end of the post 12. The two arms 20, 22 are then pivoted to their upper vertical positions as illustrated in FIG. 1 (and by arm 20 in FIG. 3), whereupon the caming elements 66, 68 are caused to project through openings 70, 72 in socket 18 and to firmly clamp the umbrella pole within the socket. In this position of the arms, their curved outer faces engage pole 4, thereby aiding in supporting the pole received within the socket. Arms 20, 22 are firmly retained in this upper vertical position by the wedging action between their caming elements 66, 68 with respect to the umbrella pole 4 received within the socket 18.

Whenever it is desired to remove the anchoring device 10 from the ground, the two arms 20, 22 are pivoted to their horizontal positions, thereby releasing the pole from the socket 18; this enables the umbrella pole 4 to be removed from the socket. The arms 20, 22, braced in their horizontal positions by bracing bars 24, 26, may then be rotated in the reverse direction to unthread post 12 from the ground, and then the arms may be pivoted to their lower vertical positions as illustrated in FIG. 5, to provide a folded compact assembly for storage, transportation or other handling. This is done by pressing fingerpieces 58 (FIG. 4) of the latching devices 52 upwardly to cause their projections 60 to move out of recesses 62 in the bracing rods 24, 26, thereby permitting the bracing rods to be pivoted about their pivot pins 42, 44 to their retracted positions folded against the underside of their respective arms 20, 22.

The Embodiment of FIGS. 6–8

FIGS. 6–8 illustrate a second embodiment of the invention very similar to that of FIGS. 1–5, and therefore corresponding elements are identified by the same reference numerals, but increased by "100", to facilitate understanding.

A main difference in the embodiment of FIGS. 6–8 is that the bracing members 124 and 126, pivotally mounted to the lower faces of the two pivotal arms 120, 122, are in the form of plates, rather than rods; in addition, they are spring-urged to their retracted, folded positions against the undersides of their respective arms by springs 127, 129, when their opposite ends are not received within the recesses 146, 148 of the post 112. Also, the undersurfaces of the free ends of bracing members 124, 126 are roughened, as shown at 124', 126', to facilitate moving them to their extending bracing positions.

The ground-anchoring device illustrated in FIGS. 6-8 includes the same latching mechanism, generally designated 152 (FIG. 7), as the FIGS. 3-5 embodiment, and operates in substantially the same manner. Thus, the pair of arms 120, 122 are also pivotal to one of three positions, namely: (a) to a horizontal position wherein they are braced by bracing plates 124, 126, to thread the post 112 into the ground; (b) to an upper vertical position wherein their cam members 166, 172 engage the pole 104 received within the socket 118 of the post 112; or (c) to a lower vertical position (illustrated in FIG. 8) providing a folded compact arrangement for handling, transportation or storage. In the arrangement of FIGS. 6-8, however, roughened surfaces 124', 126' at the ends of the bracing plates 124, 126 facilitate finger-moving the plates to their extending bracing positions received within recesses 146, 148 of the post 112, when moving the arms 120, 122 to their horizontal positions; and the springs 127, 129 bias the bracing plates 124, 126 to their folded retracted positions against their respective arm 120, 122 when the bracing plates are released from their bracing positions by depressing fingerpieces 164 of the latching device 152.

The Embodiment of FIGS. 9-11

FIGS. 9-11 illustrate a third embodiment of the invention also involving basically the same structure as the embodiment of FIGS. 3-5, and therefore its parts are also correspondingly numbered, but raised by "200". In this case, however, the bracing rods 224, 226 are pivotally mounted at one ends of the ends 224a, 226a, to the post 212, and carry pins 224b, 226b, at their opposite ends movable within slots 220a, 222a, formed in side walls 220b, 222b, of the two pivotal arms 220, 222.

In addition, the latching mechanism for latching the bracing rods 224, 226 in their extended bracing positions includes leaf springs 231, 233 struck from the arms 220, 222 and normally urged to extend below the upper face of their respective arms, as shown by leaf spring 233 in FIG. 9, such that their shoulders 231a, 233a, normally engage the pins 224b, 226b of the bracing rods 224, 226, to retain them in their extending bracing positions (as shown by bracing rod 226 in FIG. 9). In order to release the bracing rods to permit folding against the underface of their respective arms 220, 222, the leaf springs 231, 233 are pressed upwardly through slots 220c, 222c, formed in the arms 220, 222, to disengage from the pins 224b, 226b, and thereby to permit the bracing rods 224, 226 to be moved within the slots 220a, 222a, to their folded positions against the undersurface of the respective arms. FIG. 11 illustrates the ground-anchoring device of FIG. 9 in its folded condition.

The Embodiment of FIGS. 12, 13

FIGS. 12 and 13 illustrate a further embodiment, wherein the ground-anchoring device is provided with an adapter sleeve, generally designated 300, in order to adapt the device for receiving different size umbrella rods. For purposes of example, the ground-anchoring device illustrated in FIG. 12 is the same as that illustrated in FIGS. 3-5, and is therefore identified with the same reference numerals, but it will be appreciated that the adapter sleeve 300 illustrated in FIGS. 12 and 13 may be applied to any of the other above-described constructions.

The adapter sleeve 300 is received within the socket 18 formed in the upper end of the post 12, and is provided with a plurality of longitudinally-extending slits 302 to permit some expansion and contraction in diameter of the sleeve. As shown in FIG. 12, some of the slits 302 start at the upper edge of the sleeve and terminate short of the lower edge, alternating with others which start at the lower edge of the sleeve and terminate short of the upper edge. The adapter sleeve 302 is further provided with an annular rib 304 received within an annular recess 306 formed in the inner side wall of the socket 18.

The adapter sleeve 300 illustrated in FIGS. 12 and 13 is further formed with an annular rib 310 at its upper end engageable with the upper face of socket 18 to firmly retain the sleeve within the socket. The upper end of rib 310 is formed with a flat outer face 310a extending at an acute angle with respect to the longitudinal axis of the post. Face 310a serves as an annular shoulder engageable by the two pivotal arms 20, 22 when moved to their upper vertical positions with their cam elements 66, 68 in their clamping positions projecting into the socket 18, where they engage the adapter sleeve 30 and thereby firmly clamp the adapter sleeve, and the pole 4 within it, in socket 18. Thus, when using the adapter sleeve illustrated in FIGS. 12 and 13, the annular shoulder 310a, engageable by the two arms 20, 22, fix the clamping positions of the arms, whereas in the embodiment of FIGS. 3-5 the engagement of the arms with the pole itself fixes the clamping position of the arms.

While the invention has been described with respect to several preferred embodiments, it will be appreciated that many other variations, modifications and applications of the invention may be made.

What is claimed is:

1. A ground-anchoring device for anchoring a pole in the ground, comprising:
   a post formed with spiral threads at one end for threading into the ground;
   a socket at the opposite end of the post for receiving an end of the pole to be anchored in the ground;
   and a pair of arms pivotally mounted at said opposite end of the post from a horizontal position facilitating the rotation of the post to thread it into the ground, or to a vertical position;
   said pair of arms including clamping elements movable to a releasing position with respect to said socket when the arms are in their horizontal positions, or to a clamping position engaging and clamping a pole in the socket when the arms are in their vertical positions to clamp the pole within the socket.

2. The device according to claim 1, wherein said clamping elements are cam surfaces formed at the ends of said arms so as to be located in their releasing positions externally of said socket when the arms are in their horizontal positions, and to project into said socket in their clamping positions when the arms are in their vertical positions.

3. The device according to claim 1, wherein said arms are pivotal to an upper vertical position to extend above their pivotal mountings on opposite sides of the pole received in the socket, or to a lower vertical position to extend below their pivotal mountings to provide a folded compact assembly for handling or storage.

4. The device according to claim 3, wherein said arms are of curved cross-section to engage the pole therein when the arms are pivoted to their upper vertical position, to thereby aid in supporting the pole when received in said socket.

5. The device according to claim 1, wherein said arms are supported in their horizontal positions by a pair of bracing members each pivotally mounted to either an extended bracing position or to a retracted folded position folded against their respective arms.

6. The device according to claim 5, wherein said bracing members are pivotally mounted at one of their ends to the lower faces of their respective arms.

7. The device according to claim 6, wherein each of said bracing members is spring-urged towards the lower face of its respective arm.

8. The device according to claim 6, wherein each of said bracing members is releasably retained in its extended bracing position by a yieldable latching element having a projection received in a recess formed in the respective bracing member when the arms are in their horizontal positions, and is releasable by a manually-movable element moving said projection out of its respective recess.

9. The device according to claim 5, wherein each of said bracing members is pivotally mounted at one end to the post, the opposite end of each bracing member being movable in a slot formed in its respective arm when moving from the extended bracing position of the bracing member to its folded retracted position.

10. The device according to claim 9, wherein each of said bracing members is releasably retained in its extended bracing position by a latching leaf spring depending below its respective arm and movable by finger pressure through a slot formed in its respective arm to release the bracing member for movement to its folded retracted position.

11. The device according to claim 5, wherein said socket includes an adapter sleeve formed with an annular shoulder engageable by the arms to define the upper vertical positions of the arms.

12. The device according to claim 11, wherein said adapter sleeve is formed with an annular rib seatable in an annular recess formed in the socket, and with a plurality of axially-extending splits to permit variation in the sleeve diameter, and thereby to enable the sleeve to firmly grip the pole when inserted therein.

13. The device according to claim 1, wherein said post is of a hollow, tapered construction and is formed with an internal shoulder to limit the position of the pole when inserted into said socket.

14. The combination of a ground-anchoring device according to claim 1, and an umbrella having a pole secured within said socket of the ground-anchoring device.

15. A ground-anchoring device for anchoring a pole in the ground, comprising:
   a post formed with spiral threads at one end for threading into the ground;
   a socket at the opposite end for receiving an end of the pole to be anchored in the ground;
   a pair of arms pivotally mounted at said opposite ends (a) to a horizontal position facilitating the rotation of the post to thread it into the ground, (b) to an upper vertical position to extend above their pivotal mountings on opposite sides of the pole when received in said socket, or (c) to a lower vertical position to extend below their pivotal mountings to provide a folded compact assembly for handling or storage;
   and clamping elements carried by said arms and movable to a releasing position with respect to said socket when the arms are in their horizontal positions, or to a clamping position when the arms are in their upper vertical positions to engage and clamp the pole within said socket.

16. The device according to claim 15, wherein said clamping elements are cam surfaces formed at the ends of said arms so as to be located externally of said socket when the arms are in their horizontal positions, and to project into said socket when the arms are in their upper vertical positions.

17. The device according to claim 15, wherein said arms are supported in their horizontal positions by a pair of bracing members each pivotally mounted to either an extended bracing position or to a retracted folded position folded against their respective arms.

18. The device according to claim 17, wherein each of said bracing members is releasably retained in its extended bracing position by a yieldable latching element having a projection received in a recess formed in the respective bracing member when the arms are in their horizontal positions, and is releasable by a manually-movable element moving said projection out of its respective recess.

19. The device according to claim 17, wherein each of said bracing members is pivotally mounted at one end to its respective arm, the opposite end of each bracing member being receivable in a recess formed in the post in the extended bracing position of the bracing member.

20. The device according to claim 17, wherein each of said bracing members is pivotally mounted at one end to the post, the opposite end of each bracing member being movable in a slot formed in its respective arm when moving from the extended bracing position of the bracing member to its folded retracted position.

* * * * *